United States Patent [19]

Sakai

[11] Patent Number: 4,673,954

[45] Date of Patent: Jun. 16, 1987

[54] MULTI-PEN RECORDING DEVICE

[75] Inventor: Hiroaki Sakai, Fukuoka, Japan

[73] Assignee: Matsushita Electric Industrial Co., Ltd., Osaka, Japan

[21] Appl. No.: 676,401

[22] Filed: Nov. 29, 1984

[30] Foreign Application Priority Data

Nov. 29, 1983 [JP] Japan .................. 58-224752

[51] Int. Cl.⁴ .......................... G01D 15/16
[52] U.S. Cl. .................. 346/139 R; 346/49
[58] Field of Search .......... 346/49, 46, 139 R, 140 R, 346/139 A, 139 B, 139 C, 29

[56] References Cited

U.S. PATENT DOCUMENTS

| | | | |
|---|---|---|---|
| 3,550,276 | 12/1970 | Kramer | 346/139 R |
| 4,157,552 | 6/1979 | Nakajima | 346/139 R |
| 4,405,931 | 9/1983 | Fujisawa | 346/139 R |
| 4,500,890 | 2/1985 | Nicholas | 346/29 |
| 4,533,924 | 8/1985 | Takahashi | 346/49 |

Primary Examiner—E. A. Goldberg
Assistant Examiner—Mark Reinhart
Attorney, Agent, or Firm—Wenderoth, Lind & Ponack

[57] ABSTRACT

A multi-pen recording device including a carriage holding a number of pens and movable on a shaft over a writing surface, a single plunger provided for selectively urging a selected individual pen against the writing surface, a belt for driving the carriage attached to the carriage, a clutch provided on the carriage for transmitting the drive force of the belt to the plunger and for releasing the same, whereby the drive force of the belt is used as the drive force for the pen selection and is used as a single plunger for urging a pen against the writing surface which eliminates the need for a special drive source for changing over the plunger toward the respective pens.

18 Claims, 5 Drawing Figures

4,673,954

MULTI-PEN RECORDING DEVICE

BACKGROUND OF THE INVENTION

1. Field of the Invention

The invention relates to a multi-pen recording device for drawing characters and/or figures on a paper by driving pens relative to the paper in the X- and Y-directions.

2. Description of the Prior Art

Conventionally, there have been provided X-Y plotters of the type for performing monochromatic plotting and of the type for performing multi-color plotting.

In the X-Y plotters of the type for performing multi-color plotting, generally, there are two kinds, one kind being arranged such that a plurality of pens are arranged at a home position of a plot head, and when color is to be changed, the plot head once stops the plotting operation, comes back to the home position to automatically replace the pen, and begins the plotting operation again, while the other kind is arranged such that plurality of pens are mounted on a plot head and a plurality of plungers are provided corresponding to the number of pens that are driven.

There are disadvantages in the above-mentioned X-Y plotters such as in the one plotter, the plotter speed is low because the plot head comes back to the home position every time the color is changed, while in the other plotter the mass of the plot head is large due to the number of plungers which are provided on the plot head which makes it difficult to increase the printing speed.

SUMMARY OF THE INVENTION

The present invention relates to a multi-color X-Y plotter provided with a plurality of pens and has as an object to provide an X-Y plotter in which the plot head is light in weight and the plotting speed is high.

An object of the present invention is therefore to provide an X-Y plotter in which a plurality of pens are driven by a single drive source.

Another object of the present invention is to provide an X-Y plotter in which no special drive source is required for driving a pen selecting means.

A further object of the present invention is to provide an X-Y plotter in which the pen selection speed is high.

DESCRIPTION OF A PREFERRED EMBODIMENT

Figure 1:
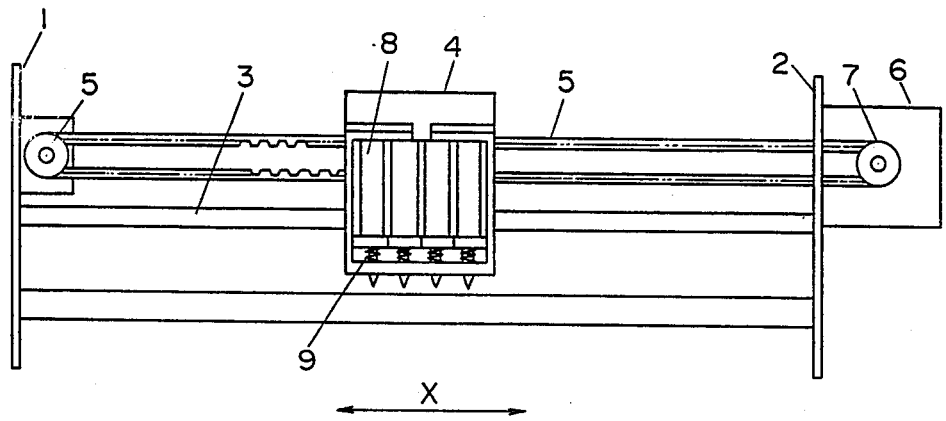
FIG. 1 is a front view of the main part of the present invention.

Referring to the drawings, a preferred embodiment of the present invention will be described hereunder. FIG. 1 is a front view of an embodiment of the X-Y plotter according to the present invention.

In FIG. 1, there is provided a carriage 4 having multi-color pens is arranged slidably in the direction of arrow X on a guide shaft 3 fixed between side plates 1 and 2. A toothed belt 5 is fixed at its upper part to the carriage 4 such that it is conveyed in the direction of arrow X by the rotation of a pulley gear 7 fixed to the shaft of a reversible pulse motor 6 for driving the carriage 4.

Figure 2:
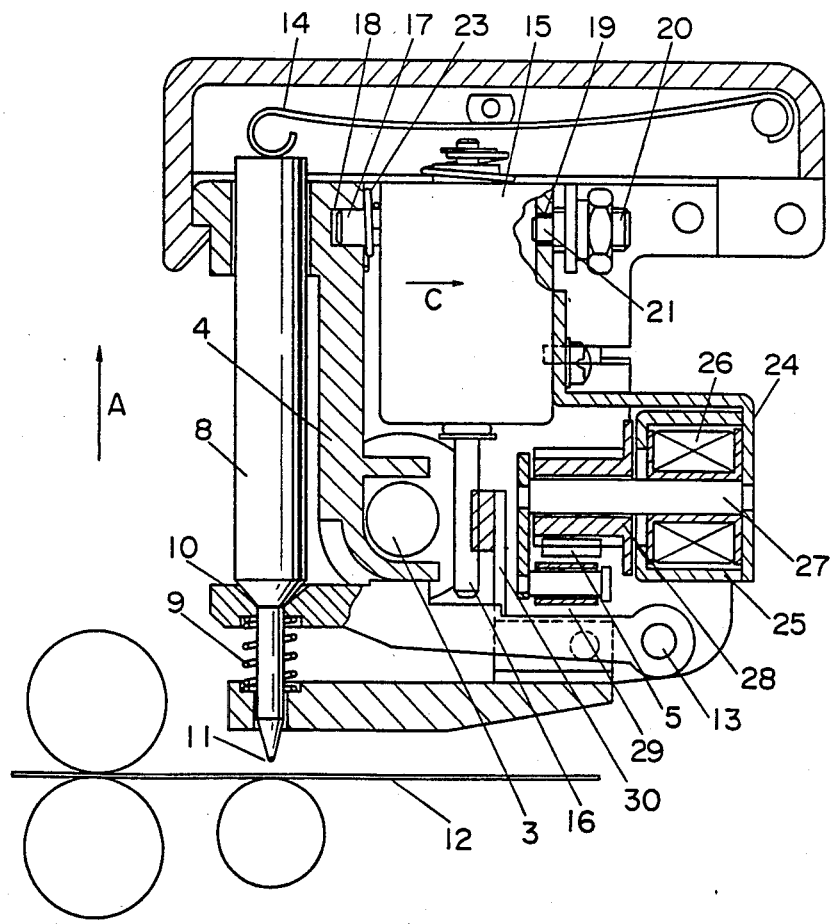
FIG. 2 is a side view of the main part of the present invention.
Figure 3:
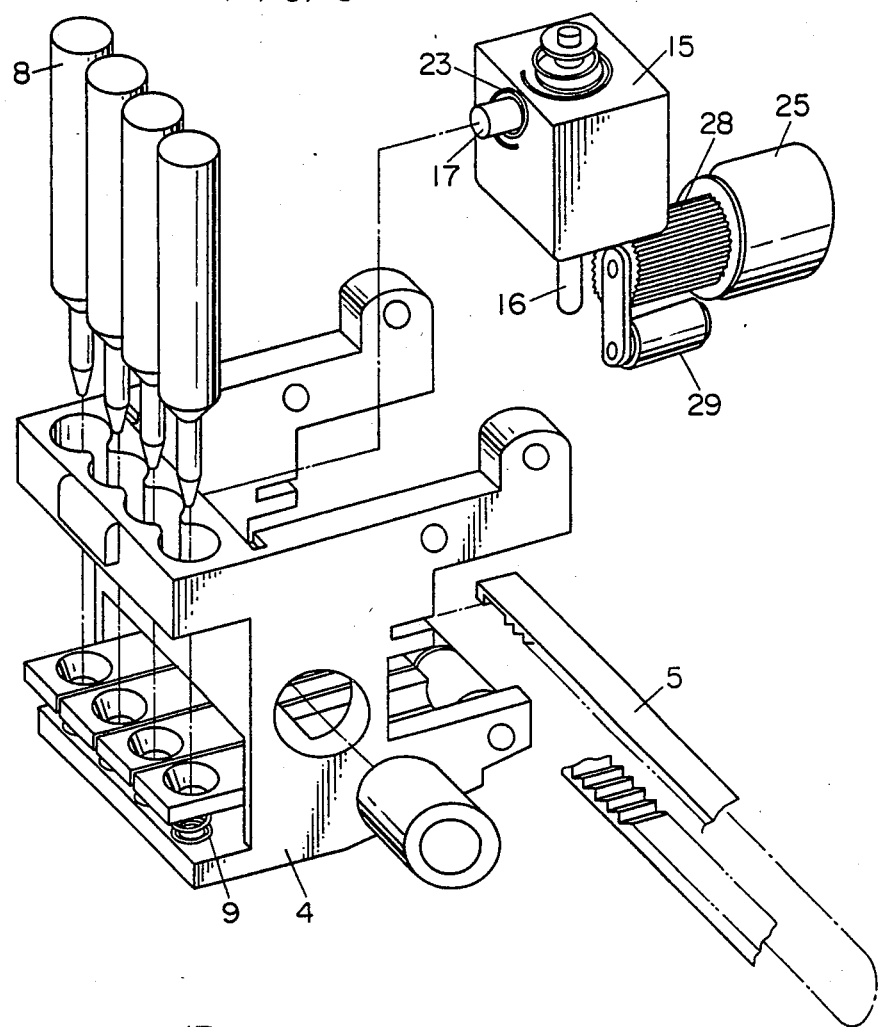
FIG. 3 is a perspective view of the main part of the present invention.

In FIG. 3, four pens 8 mounted on the carriage 4 are urged in the direction of arrow A, as shown in FIG. 2, through respective corresponding pen holding levers 10 by means of pen floating springs 9 so that respective pen tips 11 are separated from a recording paper 12. Each pen holding lever 10 is arranged to be rotatable about a pivotal axis 13.

A pen pressing spring 14 is provided above each pen 8 to bias each pen towards a respective pen holding lever such that when a single electromagnetic plunger 15 is excited, a movable core 16 is moved in the direction opposite to arrow A to move the pen holding lever 10 around a pivotal axis 13 in the direction opposite to arrow A to compress the pen floating spring 9 so that the pen tip 11 is urged against the recording paper 12 by the pen pressing spring 14.

The single electromagnetic plunger 15 has a projecting shaft 17 and an electromagnetic plunger bearing portion 19 which are held rotatably in the direction of arrow B by a carriage bearing portion 18 and a supporting shaft 21 provided at forward end of an adjusting screw portion 20, respectively. An elastic holder portion 30 having radial grooves 22 for positioning the electromagnetic plunger 15 is fixed on the carriage 4 in order to guide the movable core 16 of the electromagnetic plunger. Since an adjusting spring 23 urges the electromagnetic plunger 15 in the direction of arrow C, the position of the electromagnetic plunger 15 can be finely adjusted in the direction of arrow C or opposite thereto by the adjusting screw portion 20.

An electromagnetic clutch portion 24 is integrally attached to the electromagnetic plunger 15. Onto the electromagnetic clutch portion 24 attached are a yoke 25, an electromagnetic coil 26 disposed in the yoke, a gear shaft 27 provided integrally with yoke 25, a gear 28 arranged to be rotatable about the gear shaft 27 and to engage with a lower part of the toothed belt 5, and a belt supporting roller 29 attached integrally with the gear shaft 27 and disposed in opposition to the gear 28 with the toothed belt 5 sandwiched therebetween, the gear 28 normally engaging with the toothed belt 5.

The color changing operation in the arrangement as described above will be described hereunder.

Figure 4:
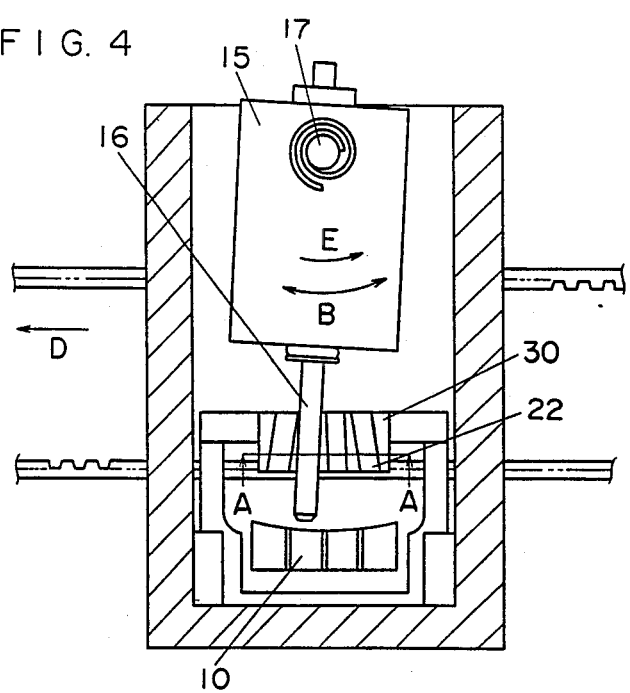
FIG. 4 is a front view of the main part of the present invention.
Figure 5:
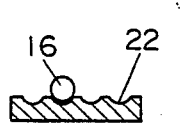
FIG. 5 is a sectional view taken along the plane of line A—A of FIG. 4.

Normally, when the carriage 4 is driven by the pulse motor 6, the lower part of the toothed belt 5, engaging with the gear 28, rotates in the direction opposite to the carriage 4, so that the gear 28 slips around the gear shaft 27. When color is to be changed, the electromagnetic plunger 24 is energized so that a magnetic path is formed around the excitation coil 26 through the route of the yoke 25, the gear shaft 27, and the gear 28, and the gear 28 is closely integrated with the yoke 25. In the state as described above, if a drive signal is applied to the carriage driving pulse motor 6 to rotate the upper part of the belt 5, for example, in the direction of arrow D (shown if FIG. 4), the lower part of the toothed belt 5, with which the gear 28 engages, moves in the direction opposite to arrow D. At this moment, since the gear 28 does not rotate, the electromagnetic clutch portion 24 is urged in the direction opposite to arrow D, so that the electromagnetic plunger 15 arranged to move integrally with the electromagnetic clutch portion 24 is urged in the direction of arrow E around the projecting shaft 17 and the electromagnetic plunger bearing portion 19. Therefore, the movable core 16 being positioned by the radial groove 22 of the elastic holder portion 23 is urged in the direction of arrow E, and the movable core 16 moves over the crest of a radial groove 22. At this time, the movable core 16 can be moved to a desired position of the radial groove 22 by controlling the pulse signal to be applied to the carriage driving pulse motor 6. The radial grooves 22 are formed to have the same pitch as the pen holding levers 10 disposed corresponding to the respective color pens, and a desired one of the pens, that is a desired one of the colors, can be selected by moving the movable core 16 to a desired position of the radial grooves 22.

What is claimed is:

1. A multi-pen recording device comprising:
   a frame;
   a shaft supported by said frame;
   a carriage slidably supported on said shaft;
   a pen holding means mounted on said carriage for supporting a plurality of pens;
   belt drive means, including a single belt connected between said frame and said carriage, for driving said carriage along said shaft;
   pen change means mounted on said carriage for moving an individual pen supported by said pen holding means from a non-writing position to a writing position; and
   clutch means, connected between said pen change means and said single belt, for positioning said pen change means in a position for moving any selected one of the plurality of pens mounted in said pen holding means into a writing position.

2. The multi-pen recording device of claim 1, wherein said pen change means includes an electromagnetic plunger for moving a selected pen in said pen holding means from a non-writing to a writing position.

3. The multi-pen recording device of claim 1, wherein said clutch means includes an electromagnetic clutch selectively engageable with said single belt for orienting said pen change means into a desired position for moving a selected pen into a writing position.

4. The multi-pen recording device of claim 1, wherein said pen holding means comprises a plurality of pen holding levers, each of said pen holding levers pivotally supported at one end thereof to said carriage and having an opening at the other end thereof for supporting a pen, each of said pen holding levers having a spring disposed between said other end supporting a pen and said carriage to thereby bias the pen in a non-writing position.

5. The multi-pen recording device of claim 4, wherein said pen change means includes an electromagnetic plunger having a movable core which is engageable with a selected one of said pen holding levers for moving a pen supported by said one of said pen holding levers from a non-writing position to a writing position.

6. The multi-pen recording device of claim 5, wherein said carriage includes spring means for urging each of the plurality of pens towards a respective one of said pen holding levers, whereby a selected pen is urged into a writing position when a pen holding lever holding the selected pen is engaged by said movable core of said electromagnetic plunger.

7. A multi-pen recording device comprising:
   a frame;
   a shaft supported by said frame;
   a carriage slidably supported on said shaft;
   belt drive means, including a single belt connecting said frame to said carriage, for moving said carriage back and forth along said shaft;
   pen holding means, mounted on said carriage, for holding a plurality of pens;
   pen change means, mounted on said carriage, for moving a selected pen held by said pen holding means from a non-writing position to a writing position; and
   means connected between said pen change means and said single belt, for orienting said pen change means into a position for moving any selected one of said pens into a writing position by a single movement of said belt drive means.

8. The multi-pen recording device of claim 7, wherein said pen change means includes an electromagnetic plunger for moving a selected pen in said pen holding means from a non-writing to a writing position.

9. The multi-pen recording device of claim 7, wherein said means for orienting said pen change means includes an electromagnetic clutch selectively engageable with said single belt for orienting said pen change means into a desired position for moving a selected pen into a writing position.

10. The multi-pen recording device of claim 7, wherein said pen holding means comprises a plurality of pen holding levers, each of said pen holding levers pivotally supported at one end thereof to said carriage and having an opening at the other end thereof for supporting a pen, each of said pen holding levers having a spring disposed between said other end supporting a pen and said carriage to thereby bias the pen in a non-writing position.

11. The multi-pen recording device of claim 10, wherein said pen change means includes an electromagnetic plunger having a movable core which is engageable with a selected one of said pen holding levers for moving a pen supported by said one of said pen holding levers from a non-writing position to a writing position.

12. The multi-pen recording device of claim 11, wherein said carriage includes spring means for urging each of the plurality of pens towards a respective one of said pen holding levers, whereby a selected pen is urged into a writing position when a pen holding lever holding the selected pen is engaged by said movable core of said electromagnetic plunger.

13. A multi-pen recording device comprising:
   a frame;
   a shaft supported by said frame;
   a carriage slidably supported on said shaft;
   a pen holding means mounted on said carriage for supporting a plurality of pens, said pen holding means comprising a plurality of pen holding levers, each of said pen holding levers pivotally supported at one end thereof to said carriage and having an opening at the other end thereof for supporting a pen, each of said pen holding levers having a spring disposed between said other end supporting a pen and said carriage to thereby bias the pen in a non-writing position;
   belt drive means, connected between said frame and said carriage, for driving said carriage along said shaft;
   pen change means mounted on said carriage for moving an individual pen supported by said pen holding means from a non-writing position to a writing position, said pen change means including an electromagnetic plunger having a movable core which is engageable with a selected one of said pen holding levers for moving a pen supported by said one of said pen holding levers from a non-writing position to a writing position, said electromagnetic plunger being pivotally attached to said carriage; and clutch means, connected between said pen change means and said belt drive means, for positioning said pen change means in a position for moving any selected one of the plurality of pens mounted in said pen holding means into a writing position, said clutch means including an electromagnetic clutch rigidly attached to said electromagnetic plunger for pivoting said electromagnetic plunger to a desired position at which said movable core is engageable with a selected one of said pen holding levers, said electromagnetic clutch connected to a gear which is freely rotatable with movement of said belt drive means when said electromagnetic clutch is not energized and which is not rotatable with movement of said belt drive means when said electromagnetic clutch is energized whereby said electromagnetic plunger is caused to pivot to a desired position by selectively actuating said belt drive means and energizing said electromagnetic clutch.

14. The multi-pen recording device of claim 13, wherein said belt drive means includes a pulse motor mounted on said frame and said single belt comprises a toothed belt rotatably supported by said frame and attached to said carriage, said toothed belt connected to said pulse motor for moving said carriage back and forth along said shaft.

15. The multi-pen recording device of claim 13, wherein said gear connected to said electromagnetic clutch engages said toothed belt of said belt drive means.

16. A multi-pen recording device comprising:
a frame;
a shaft supported by said frame;
a carriage slidably supported on said shaft;
belt drive means, connecting said frame to said carriage, for moving said carriage back and forth along said shaft;
pen holding means, mounted on said carriage, for holding a plurality of pens, said pen holding means comprising a plurality of pen holding levers, each of said pen holding levers pivotally supported at one end thereof to said carriage and having an opening at the other end thereof for supporting a pen, each of said pen holding levers having a spring disposed between said other end supporting a pen and said carriage to thereby bias the pen in a non-writing position;

pen change means, mounted on said carriage, for moving a selected pen held by said pen holding means from a non-writing position to a writing position, said pen change means including an electromagnetic plunger having a movable core which is engageable with a selected one of said pen holding levers for moving a pen supported by said one of said pen holding levers from a non-writing position to a writing position, said electromagnetic plunger being pivotally attached to said carriage; and means connected between said pen change means and said belt drive means, for orienting said pen change means into a position for moving any selected one of said pens into a writing position by a single movement of said belt drive means, said means for orienting said pen change means including an electromagnetic clutch rigidly attached to said electromagnetic plunger for pivoting said electromagnetic plunger to a desired position at which said movable core is engageable with a selected one of said pen holding levers, said electromagnetic clutch connected to a gear which is freely rotatable with movement of said belt drive means when said electromagnetic clutch is not energized and which is not rotatable with movement of said belt drive means when said electromagnetic clutch is energized whereby said electromagnetic plunger is caused to pivot to a desired position by selectively actuating said belt drive means and energizing said electromagnetic clutch.

17. The multi-pen recording device of claim 16, wherein said belt drive means includes a pulse motor mounted on said frame and said single belt comprises a toothed belt rotatably supported by said frame and attached to said carriage, said toothed belt connected to said pulse motor for moving said carriage back and forth along said shaft.

18. The multi-pen recording device of claim 16, wherein said gear connected to said electromagnetic clutch engages said toothed belt of said belt drive means.

* * * * *